(12) United States Patent
Pal

(10) Patent No.: US 7,830,059 B2
(45) Date of Patent: Nov. 9, 2010

(54) STACKED RAIL STATOR AND CAPACITIVE ARMATURE LINEAR MOTOR

(76) Inventor: Anadish Kumar Pal, 194 Vaishali, Pitampura, Delhi, Delhi (IN) 110088

( * ) Notice: Subject to any disclaimer, the term of this patent is extended or adjusted under 35 U.S.C. 154(b) by 331 days.

(21) Appl. No.: 12/189,207

(22) Filed: Aug. 11, 2008

(65) Prior Publication Data

US 2009/0045682 A1 Feb. 19, 2009

(30) Foreign Application Priority Data

Aug. 13, 2007 (IN) .................... 1720/DEL/2007

(51) Int. Cl.
- H02K 27/06 (2006.01)
- H02K 41/02 (2006.01)
- H02K 19/26 (2006.01)

(52) U.S. Cl. .............. 310/176; 310/12.21; 310/12.22; 310/12.25; 310/12.26; 310/180

(58) Field of Classification Search ... 310/12.01–12.09, 310/12.16–12.26, 176, 180; 318/135, 767; 505/166

See application file for complete search history.

(56) References Cited

U.S. PATENT DOCUMENTS

| | | | | |
|---|---|---|---|---|
| 3,001,115 A | * | 9/1961 | Gendren et al. | ............. 318/137 |
| 4,563,602 A | * | 1/1986 | Nagasaka | ................. 310/12.22 |
| 4,808,892 A | * | 2/1989 | Dreibelbis | ................... 318/135 |
| 4,887,061 A | * | 12/1989 | Matsumura | ................. 336/178 |
| 4,958,115 A | * | 9/1990 | Miller | ......................... 318/662 |
| 5,886,882 A | * | 3/1999 | Rodulfo | ........................ 363/24 |
| 7,136,293 B2 | * | 11/2006 | Petkov et al. | ................ 363/126 |

FOREIGN PATENT DOCUMENTS

FR 2789796 A3 * 8/2000

OTHER PUBLICATIONS

Machine Translation FR2789796 (2000).*

* cited by examiner

*Primary Examiner*—Quyen Leung
*Assistant Examiner*—Jose A Gonzalez Quinones

(57) ABSTRACT

A linear motor for high velocity drive has a transformer which has a magnetic circuit with a central limb; the two ends of stacked unit- or fractional-turn secondary winding of the transformer project at an angle to the longitudinal axis of the central limb; an armature links the two ends, sliding parallel to the longitudinal axis. The armature has dielectrics to form two series-connected capacitors in conjunction with the two ends. The transformer's primary winding is connected to an ac or pulse power source. The resonant frequency for the LC circuit formed by the two capacitors in series to the total effective inductance of the power source, the electric transformer and the armature is determined. The frequency or the pulse rise time of the power source is matched to the resonant frequency, in order to supply adequate electric power from the power source to the series LC circuit.

20 Claims, 10 Drawing Sheets

STACKED RAIL STATOR AND CAPACITIVE ARMATURE LINEAR MOTOR

CROSS-REFERENCE TO RELATED APPLICATIONS

Foreign application priority claimed from Indian Patent Application No. 1720/DEL/2007 of Aug. 13, 2007 entitled, 'Stacked rail stator and capacitive armature linear motor,' the contents of which are incorporated herein by reference.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

Present invention, directed to the field of electromagnetic linear motors, employs an electric power source and a laminated electromagnetic assembly with one or several linear motion armature/armatures of unidirectional electromagnetically driven wide speed capability.

All of the existing electrically powered motion-giving technologies employ a linear moving electromagnetic field. The linear movement of the electromagnetic field is either externally induced or self-induced by the linear translatory motion of a current-carrying armature along a linear twin stator. The twin stator is often schematically drawn as parallel rails to ease the theoretical understanding. However, the easy visualization as rails has impeded the evolution of technology in the present field, as many designers began concept making from a vivid visualization of parallel rails carrying a current-carrying armature and busied themselves with solving ancillary problems. Problems associated with long parallel rails were partially solved with segmental and chevron-shaped nested segmental rails; the employment of chevron-shaped nested segmental rails as inductive storage means was a step towards reducing rail-lengthwise voltage drops; but it also meant supplying very high peak currents pulses to the inductive storage means, with compulsators and the use of a very high current fast switches. Compulsators still are large and heavy and do not lend well to an integrated construction. The primary problems of arcing, arc trailing and consequent ablation of the rails were generally left to be resolved by the utilization of advanced materials. Large repulsion forces generated between the rails or the linear twin stator call for a strong binding architecture for the linear twin stator which paradoxically has to be as much light as possible for operational reasons. Further, the use of an external disposable lightweight electrode, a sabot, to the central core to the armature, a flechette or the payload, reduces the final effective momentum to the flechette. The external disposable lightweight electrode is currently necessary to bear the brunt of arcing related pitting and distortion, so that the central core remains smooth in order to reduce the final drag when it travels at high velocities through the air. There also was an attempt to have ceramic coated smooth aerodynamic projectiles electrostatically receiving and transferring electric charge to electrodes arranged in a segmental rail form; therein too, it was important to consecutively switch all the electrodes in a complex logic for an effective functioning. There is a need to address the above-mentioned issues and to develop a technology which can effectively make an electrically powered linear motion-giving high velocity motor or a launcher.

BRIEF SUMMARY OF THE INVENTION

In the first major form of the present invention, a linear electric motor for high velocity drive is built with at least one electric transformer with a magnetic circuit which has a central limb. The two ends of at least one unit-turn or fractional turn secondary winding of the transformer project at an angle which is not normal to the longitudinal axis of the central limb. The two ends are substantially coplanar and symmetrically disposed on the two sides of an imaginary median along the longitudinal axis. At least one armature means slidingly linking the two ends, confined to be moveable parallel to the longitudinal axis and physically in contact with the two ends. Either the armature means or the two ends or both have dielectric means to electrically insulate the armature means from the two ends. The dielectric means have unity or more than unity electrical permittivity. Two series-connected capacitors formed by the electrical permittivity of the dielectric means between the armature means and the two ends. The electric transformer has a primary winding connected with connection means to an alternating current electric power source. There is also an electronic estimation means for the resonant frequency of a series LC circuit. The LC circuit consists of the two series-connected capacitors in series to the total effective inductance of the effective inductance respectively of the alternating current power source, the connection means, the electric transformer, the two ends and the armature means. The fundamental frequency of the alternating current power source is matched to the resonant frequency to supply electric power from the alternating current power source to the series LC circuit. The electrically conductive parts of the primary winding and the secondary winding of the electric transformer can also either be made of good conductors or superconductors; and the electrically conductive parts of the armature means too can either be made of a good conductor or a superconductor.

The first major form of the present invention in a further elaboration has two numbers of the transformer, which have their longitudinal axis of the central limb placed parallel to each of the two ends of each of the secondary windings respectively integrated equipotentially in a chevron shape. This is to prevent a substantial consumption of the electric power and also to form a channel with a uniform section. The channel is running parallel to both the longitudinal axes, and the uniform section uniformly is flanked symmetrically by the two numbers of the transformer. The most acute angle portion of the chevron shape points as an imaginary arrowhead to the direction of linear motion by the armature means under the influence of electromagnetic forces. The electromagnetic forces are produced with a large induced alternating current of the electric power flowing through the armature means, causing the substantial consumption of the electric power. Also, a plurality of the unit-turn or fractional turn secondary windings are placed in resistive separation, side by side, forming a bonded stack along the longitudinal axis. The armature means comprises a central core surrounded by light weight conductive brushes coated with the dielectric means; and the brushes are disposable after the armature means leave the linear motor after the high velocity drive.

In another variant to the first form of the present invention, the transformer has the longitudinal axis of the central limb placed parallel to the two ends of the secondary winding, to form the channel with a uniform section. The channel is running parallel to the longitudinal axis. The two ends of at least one unit-turn or fractional turn secondary winding of the transformer, project centripetal secant-wise to the circular cross section of the central limb, at the angle which is not normal to the longitudinal axis of the central limb. The uniform section is uniformly enclosed inside the central limb; and the angle is an acute angle and points as an imaginary half arrowhead to the direction of linear motion by the armature means. The linear motion takes place under the influence of electromagnetic forces which are produced with a large induced alternating current from the electric power flowing through the armature means. This causes a substantial consumption of the electric power. Further, the unit-turn or fractional turn secondary windings are placed in resistive separation, side by side, forming a bonded stack along the longitudinal axis. The bonded stack is integrated with the central limb, forming an electromagnetic flux concentrator bored cylindrical rod; and the electromagnetic flux concentrator bored cylindrical rod is either permanently fixed to the electric transformer or is replaceable in service. In a variation, the armature means is composed of a central core surrounded by light-weight conductive brushes coated with the dielectric means; and the brushes disposable after the armature means leave the linear motor after the high velocity drive. In another structural improvement, each of the plurality of unit-turn or fractional turn secondary windings is at a successive angular shift relative to the others of the plurality of unit-turn or fractional turn secondary windings. The two ends, with the angular shift, reach the axis of the cylindrical rod to form the channel. The channel has a circular cross section component which is coaxial to the cylindrical rod. Each of the unit-turn or fractional turn secondary windings and the two ends, both, are drawn in a shape with upper and lower surfaces. The shape perfectly fits on a matching imaginary circular cone. Or, alternatively, each of the unit-turn or fractional turn secondary windings is circular and each the two ends are drawn in a shape with upper and lower surfaces, which perfectly fits a matching imaginary circular cone. In all the various embodiments of the present invention described hereinabove, the plurality of secondary windings are longitudinally enclosed externally by a cylindrical or semi-cylindrical magnetic circuit having a magnetic permeability of unity of more than unity.

The second major form of the present invention is made up of at least one electric transformer with a magnetic circuit having a central limb, as is the first form described hereinbefore. Only distinction being the two ends of a unit-turn or fractional turn secondary winding of the transformer do not project and are, respectively, joined electrically to two electrodes projecting at an angle which is not normal to the longitudinal axis of the central limb. The two electrodes are substantially coplanar and symmetrically disposed on the two sides of an imaginary median along the longitudinal axis. The two electrodes function as the earlier-summarized two ends in the first major form of the present invention. A plurality of the two electrodes are placed in resistive separation, side by side, forming a bonded stack rod along the longitudinal axis; and the bonded stack rod is either permanently fixed to the electric transformer or is replaceable in service. Further, in another variation, summarized already, the bonded stack rod is integrated with the central limb, forming an electromagnetic flux concentrator bored cylindrical rod; and the electromagnetic flux concentrator bored cylindrical rod is either permanently fixed to the electric transformer or is replaceable in service.

All the variants of the third major form of the present invention are construction wise identical to the first and the second major forms of the present invention already summarized hereinabove. Except for the fact that at least one pulse transformer with a magnetic circuit having a central limb is used instead of earlier-described at least one electric transformer and its variations. The pulse transformer has a primary winding connected with connection means to an electric pulse power source. An estimation means is there for estimation of the resonant frequency of a series LC circuit. The series LC circuit is composed of the two series-connected capacitors in series to the total effective inductance of the effective inductance respectively of the pulse current power source, the connection means, the pulse transformer, the two ends and the armature means. The armature means summarized hereinabove, slidingly linking the two ends for a travel time which is matched to half of the time period of the resonant frequency by the variation of voltage of the electric power from the pulse current power source to the series LC circuit. A pulse current electric power source produces pulses with a rise time which is always smaller than quarter of the time period.

All the variants of the fourth form of the present invention are similar to the third form summarized above. Only exception being the fact that the two ends of a unit-turn or fractional turn secondary winding of the pulse transformer are electrically joined to two electrodes projecting at an angle which is not normal to the longitudinal axis of the central limb. The two electrodes are, as described in other preceding forms of the present invention, substantially coplanar and symmetrically disposed on the two sides of an imaginary median along the longitudinal axis.

In another modified form of the present invention, a linear electric motor for high velocity drive is built with at least one electric transformer with a magnetic circuit which has a central limb. The two ends of at least one unit-turn or fractional turn secondary winding of the transformer project at an angle which is not normal to the longitudinal axis of the central limb. The two ends are substantially coplanar and symmetrically disposed on the two sides of an imaginary median along the longitudinal axis. At least one armature means slidingly linking the two ends, confined to be moveable parallel to the longitudinal axis and physically in contact with the two ends. The armature means having dielectric means to electrically insulate the two ends from one another. The dielectric means has unity or more than unity electrical permittivity. At least two capacitors formed by the electrical permittivity of the dielectric means. The electric transformer has a primary winding connected with connection means to an alternating current electric power source. There is an estimation means for the resonant frequency of a series LC circuit composed of the two capacitors in series to the total effective inductance of the effective inductance respectively of the alternating current power source, the connection means, the electric transformer, the two ends and the armature means. The fundamental frequency of the alternating current power source is matched to the resonant frequency to supply electric power from the alternating current power source to the series LC circuit. The electrically conductive parts of the primary winding and the secondary winding of the electric transformer can also either be made of good conductors or superconductors; and the electrically conductive parts of the armature means too can either be made of a good conductor or a superconductor.

Following are some of the objectives which can be met by various forms of the present invention which is basically a linear motor for high velocity drive:

A high velocity flechette thrower employing a two-transformer version of the present invention.

A high velocity flechette thrower employing a single-transformer version of the present invention.

A high velocity aerodynamically shaped sabot-less projectile thrower employing a two-transformer version of the present invention.

A high velocity aerodynamically shaped sabot-less projectile thrower employing a single-transformer version of the present invention.

A high velocity aerodynamically shaped mass launcher employing a two-transformer version of the present invention.

A high velocity aerodynamically shaped mass launcher employing a single-transformer version of the present invention.

BRIEF DESCRIPTION OF THE SEVERAL VIEWS OF THE DRAWINGS

Accompanying drawings on ten drawing sheets are nineteen in number. Numerals with backslash are employed to identify features and components of the drawings. Numeral indicia to the left of backslash \ denote figure number, numeral indicia to the right hand side of backslash \ identify a feature. Identical right hand side numerals denote functional and/or positional similarity throughout the several views.

DETAILED DESCRIPTION OF THE INVENTION

Figure 1:
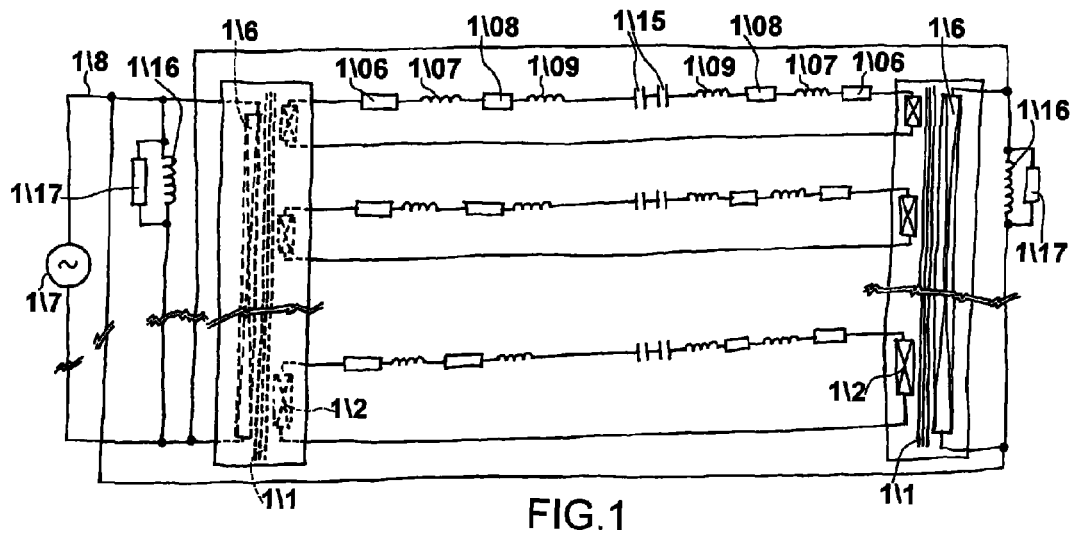
FIG. 1 is a schematic electrical circuit of the two-transformer version of the present invention.
Figure 2:
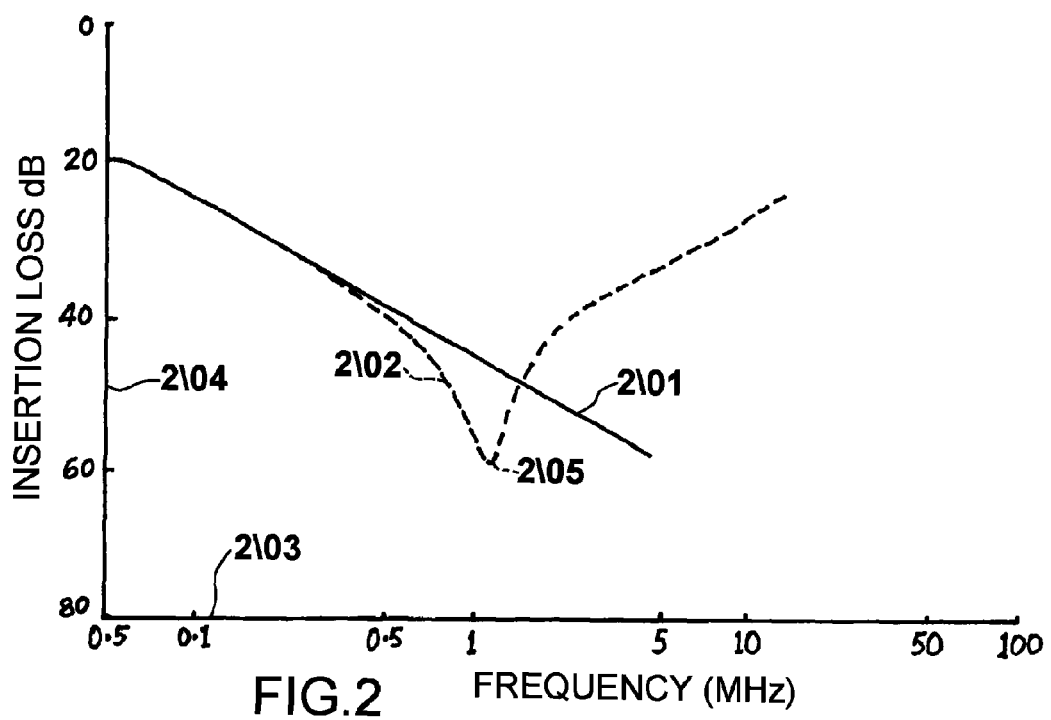
FIG. 2 is a schematic plot of insertion loss versus frequency for a leaded monolithic two-terminal ceramic capacitor of 1.0 µF in resonance and not in resonance.
Figure 3:
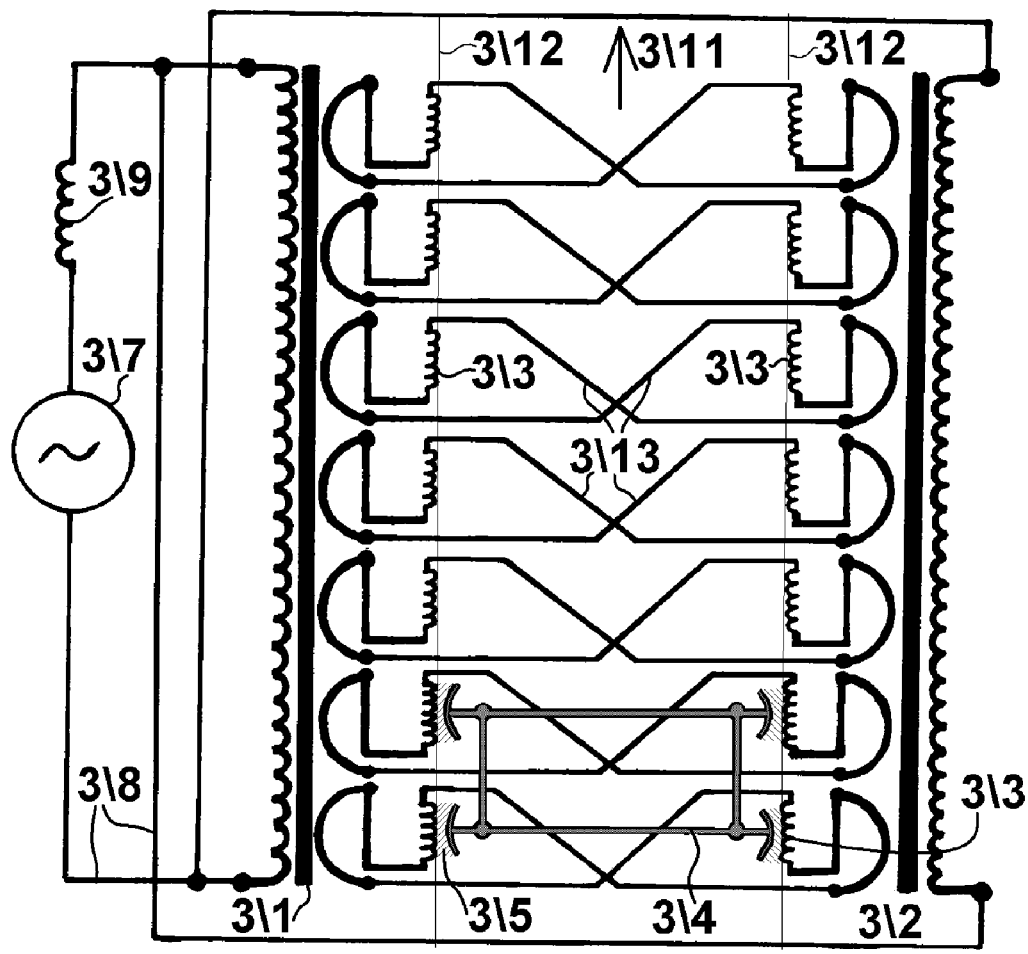
FIG. 3 is a schematic operational circuit of a two-transformer version of the present invention, where the armature means has a coating of the dielectric means.
Figure 4:
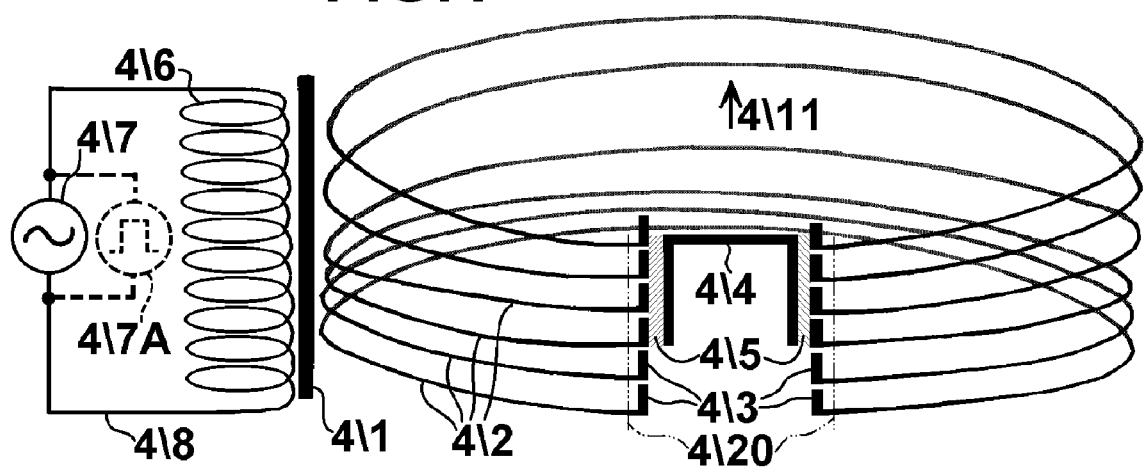
FIG. 4 is a schematic operational circuit of a single-transformer version of the present invention, where the armature means has a coating of the dielectric means.
Figure 5:
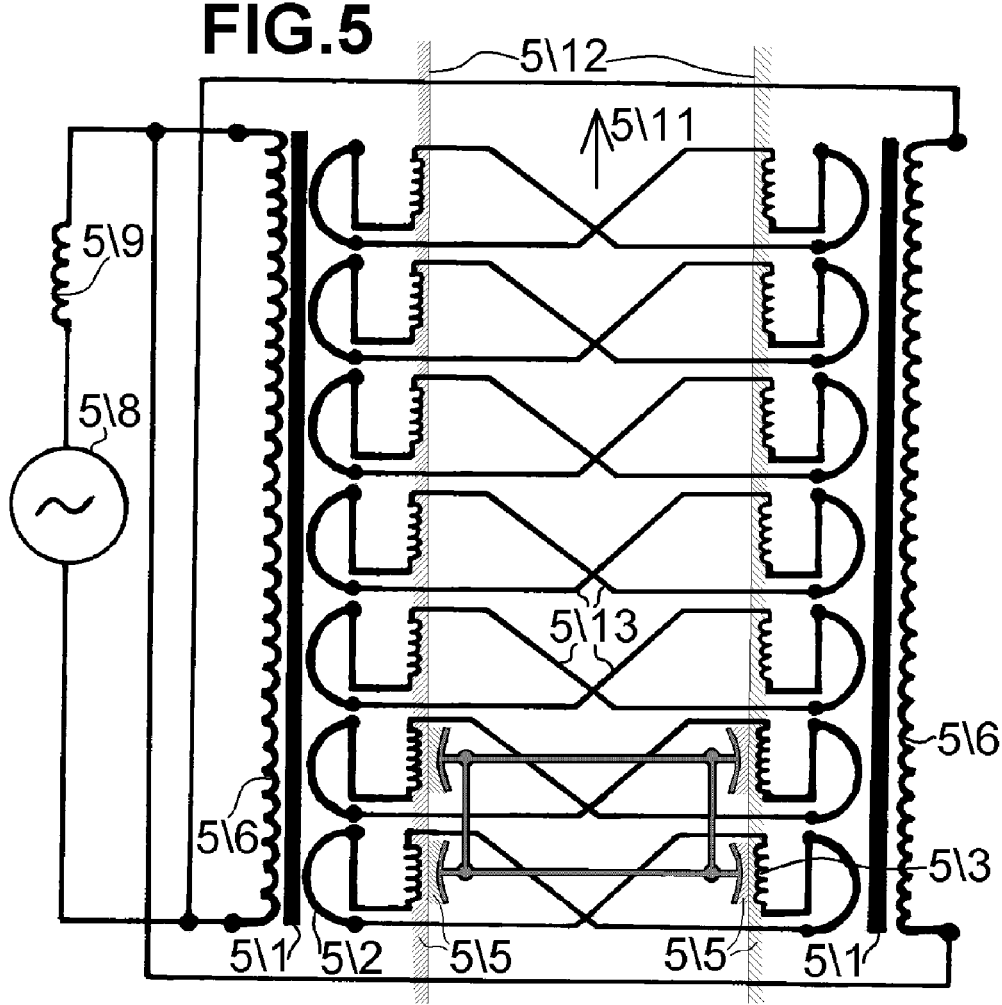
FIG. 5 is a schematic operational circuit of a two-transformer version of the present invention, where the armature means and the two ends both have a coating of the dielectric means.
Figure 6:
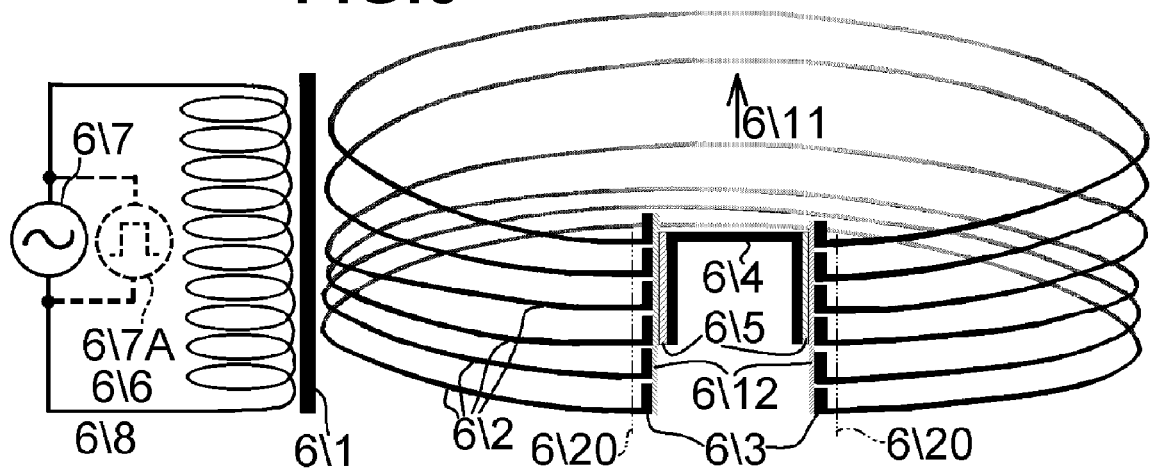
FIG. 6 is a schematic operational circuit of a single-transformer version of the present invention, where the armature means and the two ends both have a coating of the dielectric means.

The first major form of the present invention has at least one electric transformer [FIG. 4, FIG. 6] with magnetic circuit having central limb 4\1, 6\1. Two ends 4\3, 6\3 of at least one unit-turn or fractional turn secondary winding 4\2, 6\2 of the transformer, projecting at an angle which is not normal to longitudinal axis 4\11, 6\11 of central limb 4\1, 6\1. Two ends 4\3, 6\3 substantially coplanar and symmetrically disposed on the two sides of an imaginary median, along longitudinal axis 4\11, 6\11. At least one armature means 4\4, 6\4 slidingly linking two ends 4\3, 6\3, confined to be moveable parallel to longitudinal axis 4\11, 6\11 and physically in contact with two ends 4\3, 6\3. Either armature means 4\4, 6\4 or two ends 4\3, 6\3 or both having dielectric means 4\5, 6\5 to electrically insulate armature means 4\4, 6\4 from two ends 4\3, 6\3. Dielectric means 4\5, 6\5 having unity or more than unity electrical permittivity. Two series-connected capacitors formed by the electrical permittivity of dielectric means 4\5, 6\5 between armature means 4\4, 6\4 and two ends 4\3, 6\3. The electric transformer having primary winding 4\6, 6\6 connected with connection means 4\8, 6\8 to alternating current electric power source 4\7, 6\7. Estimation means for the resonant frequency of a series LC circuit comprising two series-connected capacitors in series to the total effective inductance of the effective inductance of alternating current power source 4\7, connection means 4\8, the electric transformer, two ends 4\3 and armature means 4\4. The fundamental frequency of alternating current power source 4\7 is matched to the resonant frequency to supply electric power from alternating current power source 4\7 to the series LC circuit. The electrically conductive parts of primary winding 4\6 and secondary winding 4\2 of the electric transformer are either made of good conductors or superconductors; and the electrically conductive parts of armature means 4\4 too are either made of a good conductor or a superconductor.

The first variant of the first major form of the present invention has two numbers of the electric transformer which have each longitudinal axis of each central limb 1\1, 3\1 placed parallel to each two ends 7\3, 8\3 of each secondary winding respectively integrated equipotentially in chevron shape 7\13, 8\13 to prevent a substantial consumption of electric power and to form a channel with uniform section, running parallel to each longitudinal axis, and the uniform section uniformly flanked symmetrically by said two numbers of the electric transformer; the most acute angle portion of chevron shape 8\13 points as an imaginary arrowhead to direction 8\11 of linear motion by armature means 3\4, 4\4 under the influence of electromagnetic forces produced with a large induced alternating current of the electric power flowing through armature means 3\4, 4\4, causing the substantial consumption of electric power.

A plurality of unit-turn or fractional turn secondary windings 5\2, 8\2 which are placed in resistive separation, side by side, forming bonded stack rod 7\25 along longitudinal axis.

Figure 9:
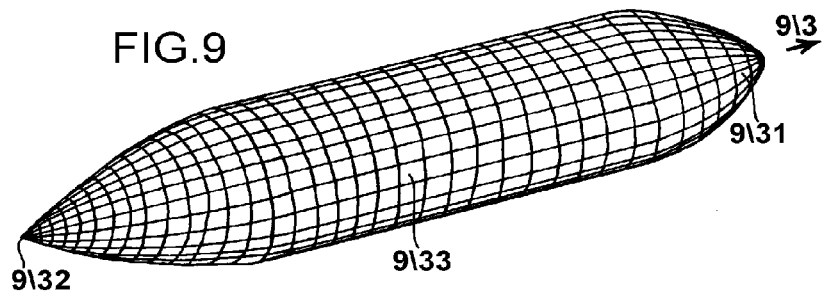
FIG. 9 is a general diagrammatic view of a flechette.
Figure 10:
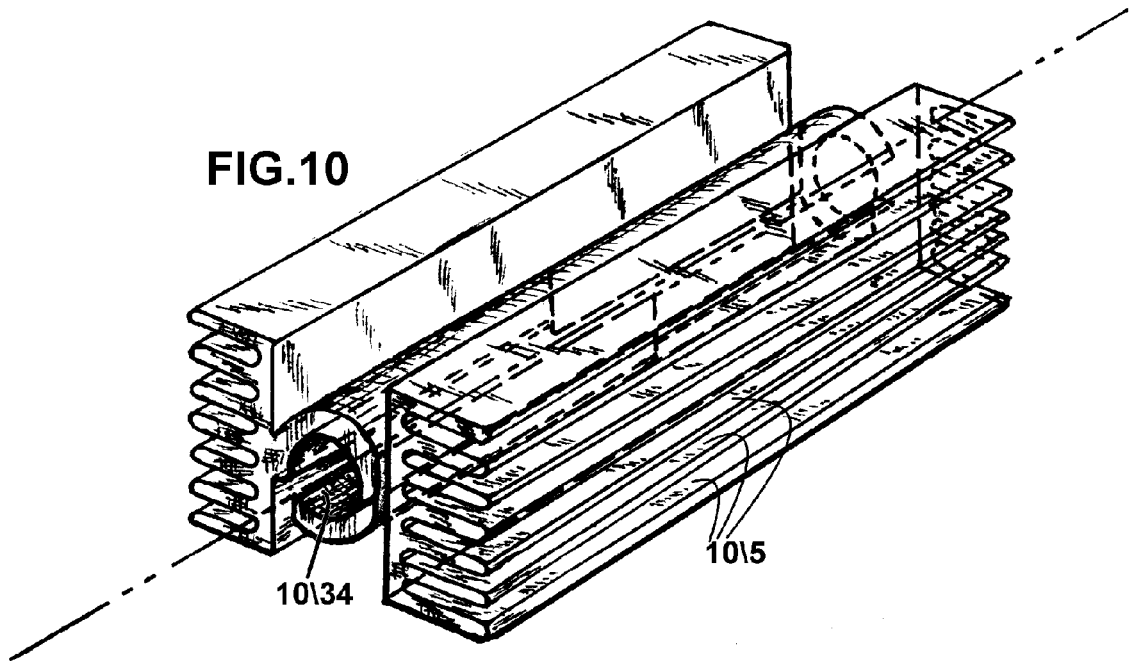
FIG. 10 is a perspective view of a sabot from a version of the present invention.
Figure 11:
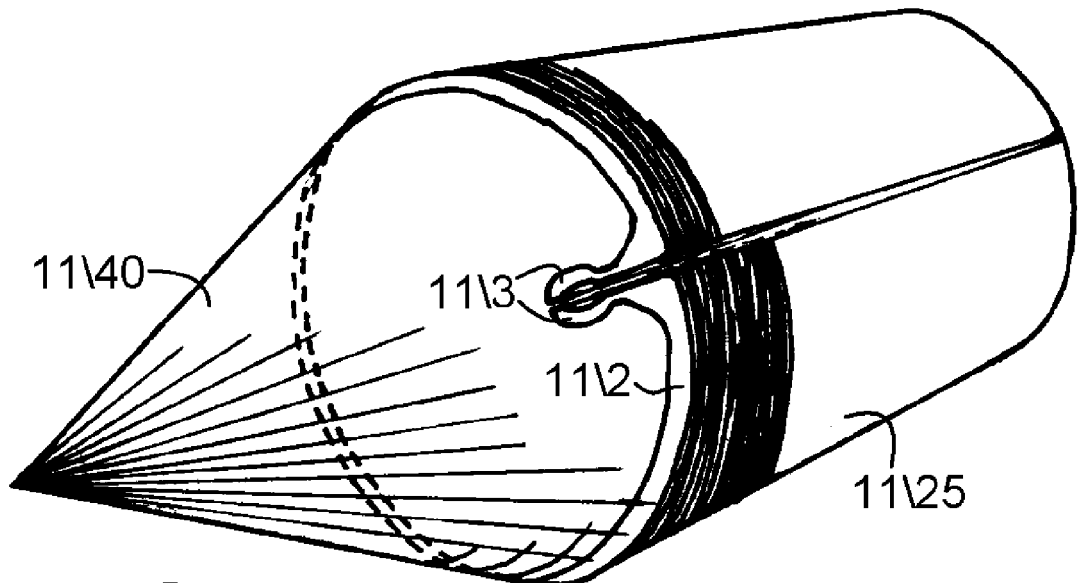
FIG. 11 is a representative diagrammatic view of the unit-turn or fractional turn secondary winding and said two ends, both, drawn in a conical shape. This is a single-transformer version of the present invention.

Armature means 3\4, 4\4 having a central core (flechette) shown overall in FIG. 9 surrounded by lightweight conductive brushes shown generally in FIG. 10 coated with dielectric means (sabot dielectric coat 10\5); and the brushes are disposable after armature means 3\4, 4\4 leave the linear motor after receiving the high velocity drive. The central core (flechette) has leading edge 9\31, trailing edge 9\32 and grid area 9\33. Grid area 9\33 comes in electrical contact with gripping area 10\34.

The second variant of the first major form of the present invention transformer having the longitudinal axis 12\11 of central limb 12\1, 16\1 placed parallel to two ends 12\3, 12\3 of 12\2 secondary winding, to form the channel with a uniform section, running parallel to longitudinal axis 12\1, 16\1; said two ends of at least one unit-turn or fractional turn secondary winding of said transformer, projecting centripetal secant-wise to the circular cross section of said central limb at the angle which is not normal to the longitudinal axis of said central limb. The uniform section uniformly enclosed inside central limb 12\1, 16\1; and the angle is an acute angle and points as an imaginary half arrowhead to the direction of linear motion by armature means 4\4, 6\4 under the influence of electromagnetic forces produced with a large induced alternating current from the electric power flowing through armature means 4\4, 6\4, causing a substantial consumption of the electric power mentioned hereinbefore.

A plurality of unit-turn or fractional turn secondary windings 4\2 are placed in resistive separation, side by side, forming bonded stack 11\25 along longitudinal axis 11\11. Bonded stack 11\25 is integrated with central limb 12\1, 17\1, forming an electromagnetic flux concentrator bored cylindrical rod; and the electromagnetic flux concentrator bored cylindrical rod is either permanently fixed to said electric transformer or is replaceable in service. Armature means 4\4, 6\4 comprises central core [FIG. 9] surrounded by light-weight conductive brushes [FIG. 10] coated with already discussed dielectric means; and the brushes disposable after the armature means leave the linear motor after receiving the high velocity drive.

Figure 12:
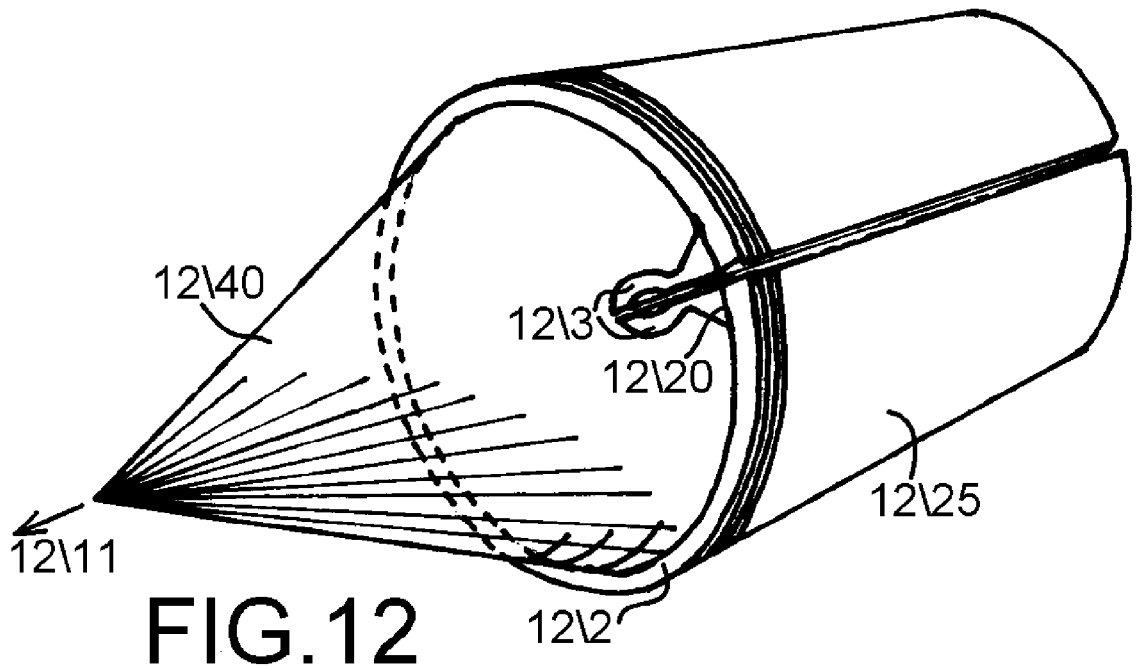
FIG. 12 is a representative diagrammatic view of the unit-turn or fractional turn secondary winding which is circular and only the two ends are drawn in a conical shape. This is a single-transformer version of the present invention
Figure 13:
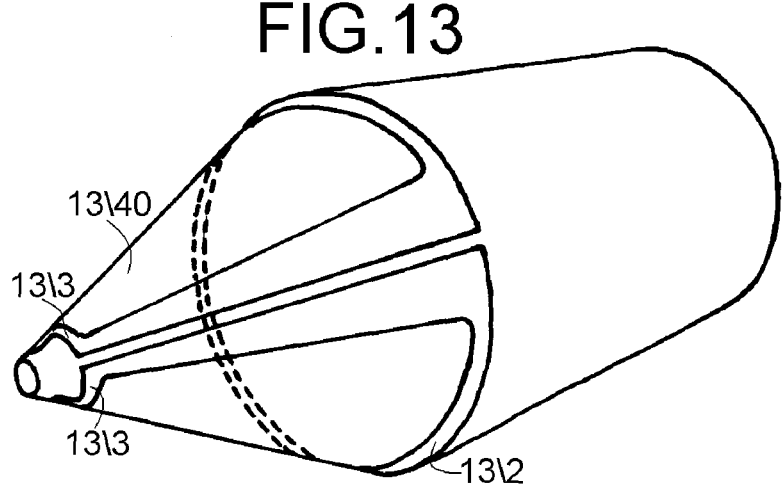
FIG. 13 is a representative diagrammatic view of the unit-turn or fractional turn secondary winding and the two ends, both, drawn in a conical shape, with the two ends for steady contact with the projectile. This is a single-transformer version of the present invention.
Figure 14:
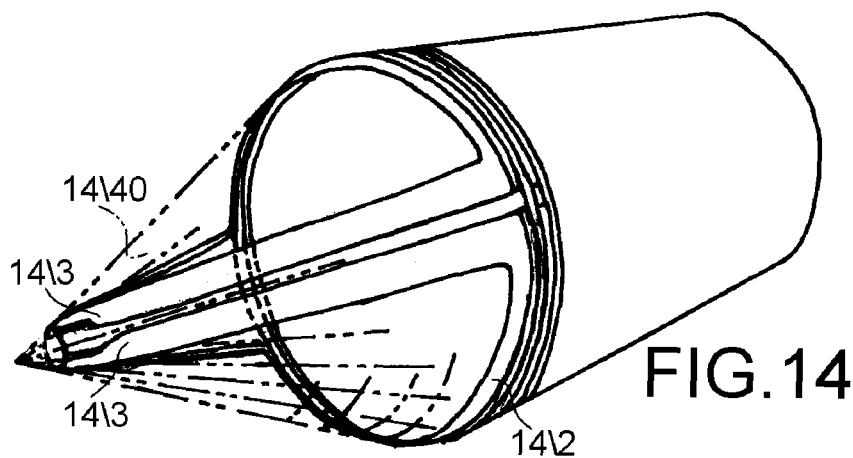
FIG. 14 is a representative diagrammatic view of the unit-turn or fractional turn secondary winding and the two ends, both, drawn in a conical shape, with the two ends for variable contact with the projectile. This is a single-transformer version of the present invention.
Figure 15:
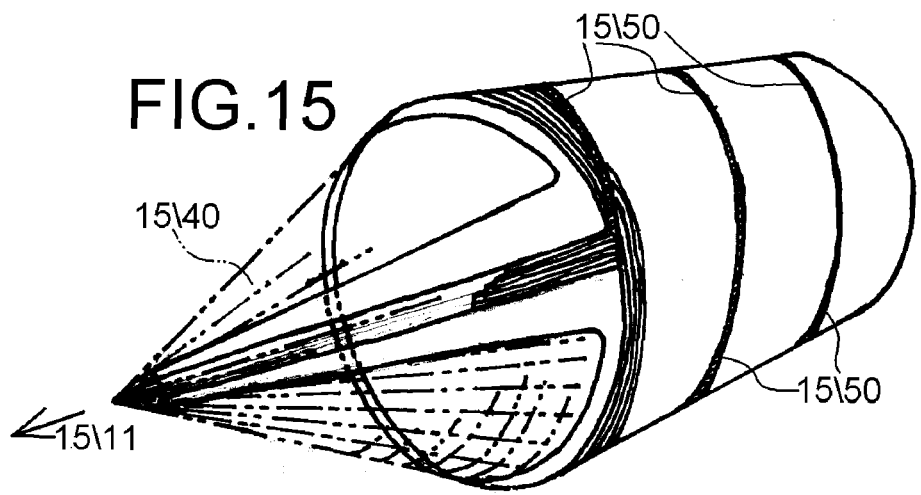
FIG. 15 is a representative diagrammatic view of the unit-turn or fractional turn secondary winding and the two ends, both, drawn in a conical shape, with successive two ends angularly shifted for variable contact with the projectile. This is a single-transformer version of the present invention

Each of the plurality of unit-turn or fractional turn secondary windings 4\2, 15\2 is at a successive angular shift [shown in FIG. 15] relative to the others of the plurality of unit-turn or fractional turn secondary windings 15\2; with the two ends, with the angular shift, reaching axis 15\11 of the cylindrical rod to form the channel. The angular shift results in the formation of helical groove 15\50. The channel has a circular cross section component which is coaxial to said cylindrical rod; and either each of said unit-turn or fractional turn secondary windings and said two ends, both, are drawn in a shape with upper and lower surfaces [as in FIG. 15], which perfectly fits on a matching imaginary circular cone, or each unit-turn or fractional turn secondary windings 12\2 is circular and each two ends 12\3 are drawn in a shape with upper and lower surfaces [as in FIG. 12], which perfectly fits matching imaginary circular cone 12\40.

Figure 16:
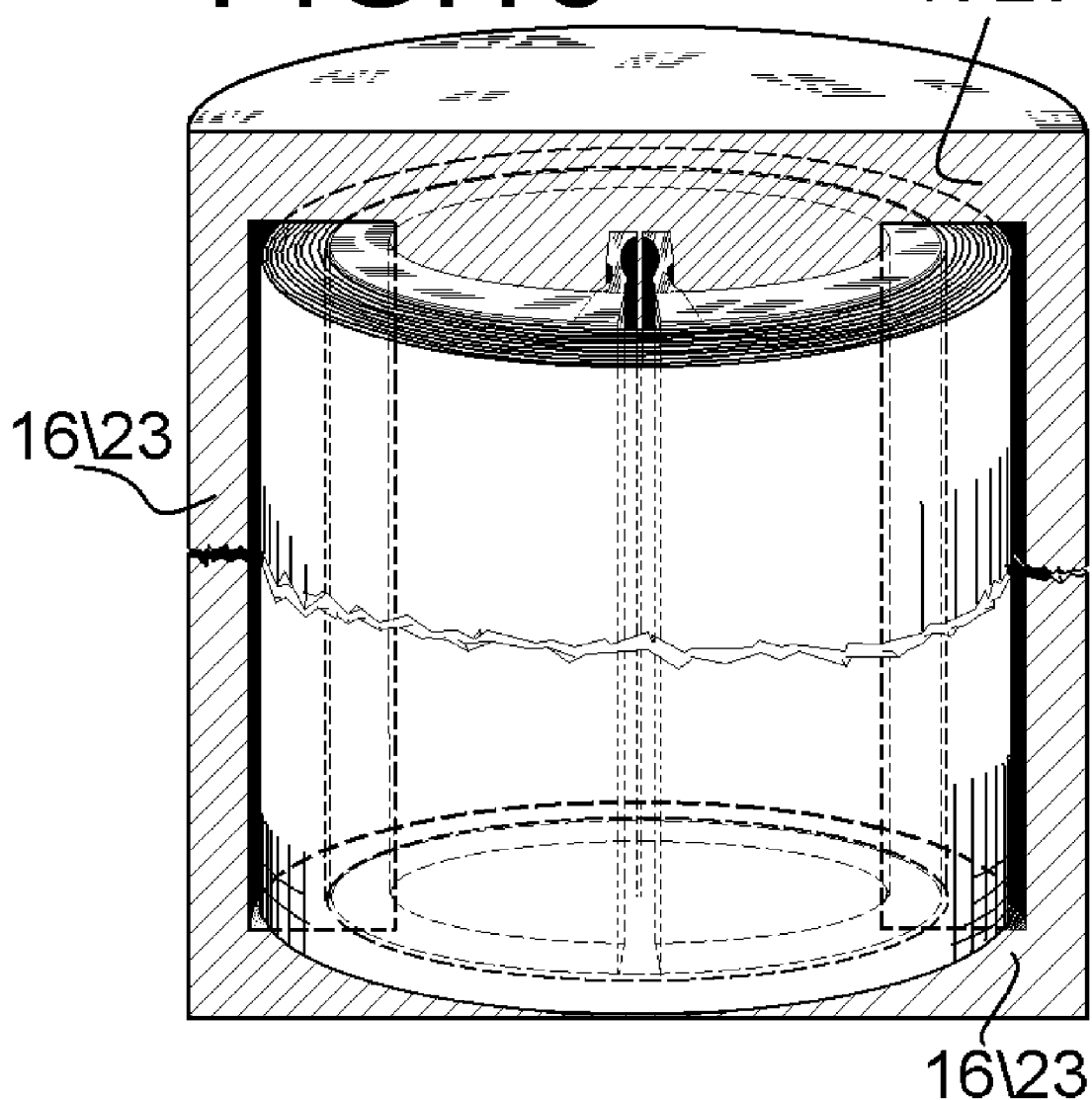
FIG. 16 is an elevation view in perspective of the version of the present invention partially depicted in FIG. 12. A sectional view of the magnetic circuit is also incorporated herein.
Figure 17:
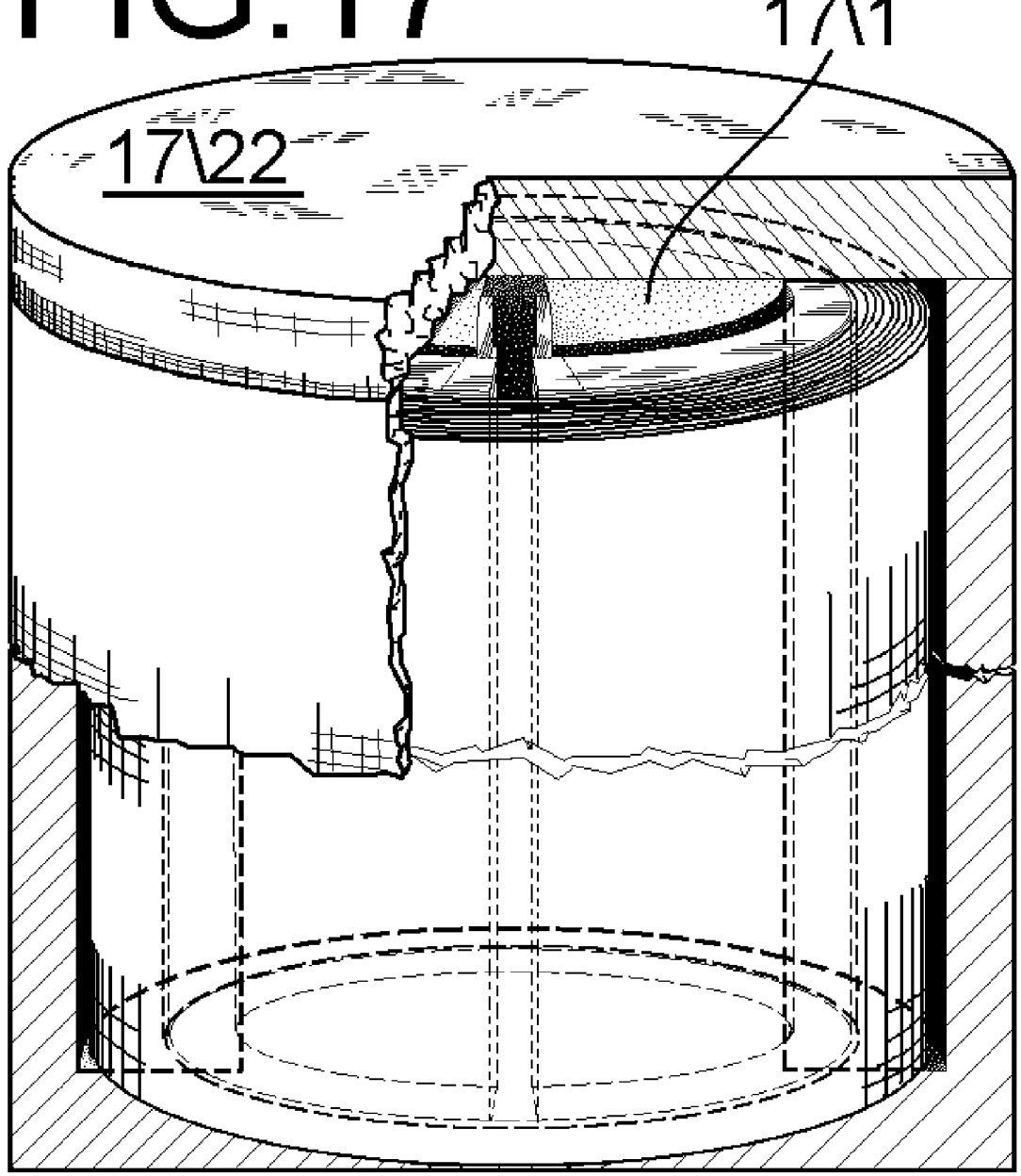
FIG. 17 is an elevation view in perspective of a sabot version of the present invention partially depicted in FIG. 12. A cut away view with broken lines of the magnetic circuit is also incorporated herein.

The plurality of secondary windings are longitudinally enclosed externally by a cylindrical or semi-cylindrical magnetic circuit [distinctly shown in FIG. 16 and FIG. 17] having a magnetic permeability of unity of more than unity.

The second form of the present invention has at least one electric transformer with a magnetic circuit having central limb. Two ends of unit-turn or fractional turn secondary winding of the transformer, respectively joined electrically [at imaginary joining line 4\20, 6\20] to two electrodes projecting at an angle which is not normal to the longitudinal axis of central limb. The two electrodes are substantially coplanar and symmetrically disposed on the two sides of an imaginary median along longitudinal axis 4\11, 6\11. At least one armature means 4\4, 6\4 slidingly linking the two electrodes, confined to be moveable parallel to longitudinal axis 4\11, 6\11 and physically in contact with the two electrodes. Either armature means or the two electrodes or both having dielectric means 4\5 or 6\5 to electrically insulate armature means from the two electrodes; dielectric means 4\5 or 6\5 having unity or more than unity electrical permittivity. Two series-connected capacitors [schematically represented by capacitors 1\15 for a two-transformer version] formed by the electrical permittivity of dielectric means 4\5 or 6\5 between armature means 4\4 or 6\4 and the two electrodes, the electric transformer having primary winding 4\6 or 6\6 connected with connection means 4\8, 6\8 to alternating current electric power source 4\7, 6\7; an estimation means for the resonant frequency of a series LC circuit comprising the two series-connected capacitors in series to the total effective inductance of the effective inductance respectively of alternating current power source 4\7, 6\7, connection means 4\8, 6\8, the electric transformer, the two electrodes and armature means 4\4 or 6\4; the fundamental frequency of alternating current power source 4\7, 6\7 is matched to the resonant frequency to supply electric power from alternating current power source 4\7, 6\7 to the series LC circuit; the electrically conductive parts of primary winding 4\6, 6\6 and secondary winding 4\2, 6\2 of the electric transformer are either made of good conductors or superconductors; and the electrically conductive parts of armature means 4\4 or 6\4 too are either made of a good conductor or a superconductor.

Figure 7:
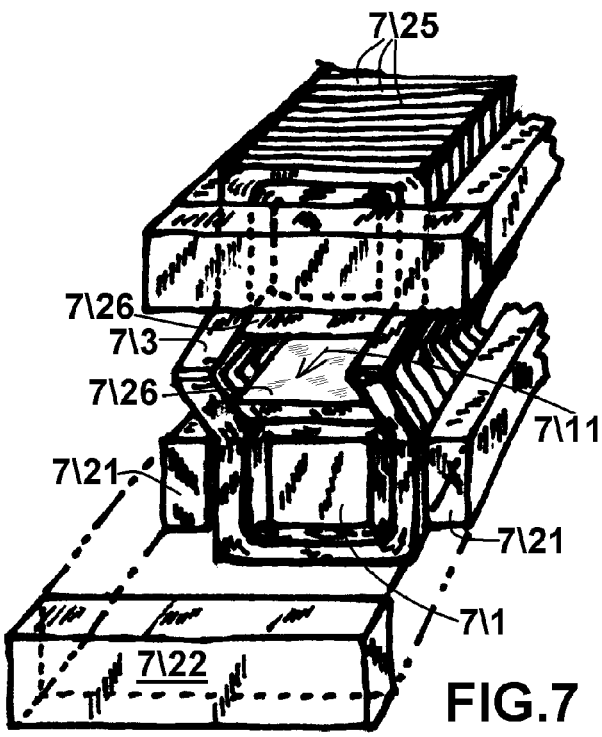
FIG. 7 is a schematic perspective view of a two-transformer version of the present invention.
Figure 8:
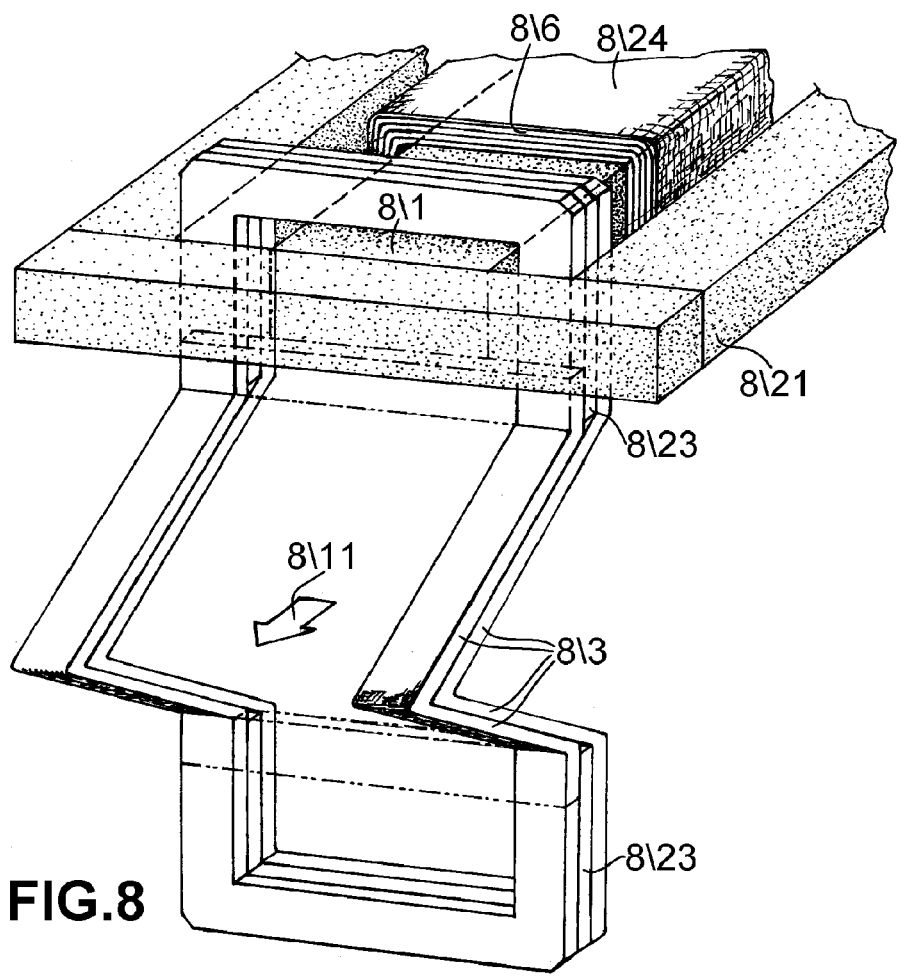
FIG. 8 is a schematic perspective view of a two-transformer version of the present invention, showing secondary winding details.

The first variant of the second major form of the present invention has two numbers of the transformer which have the longitudinal axis of central limb 3\1 or 5\1 placed parallel to each two electrodes which are respectively integrated equipotentially in chevron shape 3\13, 5\13 to prevent a substantial consumption of the electric power and to form a channel with a uniform section, running parallel to each said longitudinal axis [shown in FIG. 7, FIG. 8]; and the uniform section uniformly flanked symmetrically by the two numbers of the transformer. The most acute angle portion of the chevron shape points as an imaginary arrowhead to the direction of linear motion by armature means 5\4, 6\4 under the influence of electromagnetic forces produced with a large induced alternating current of the electric power flowing through armature means 5\4, 6\4, causing the substantial consumption of the electric power.

A plurality of the two electrodes are placed in resistive separation, side by side, forming bonded stack rod 7\25 along longitudinal axis 7\11; and bonded stack rod is either permanently fixed to the electric transformer or is replaceable in service.

Armature means 4\4, 6\4 comprises central core [FIG. 9] surrounded by light-weight conductive brushes [FIG. 10]

coated with earlier mentioned dielectric means; and the brushes disposable after armature means 4\4, 6\4 leave the linear motor after receiving the high velocity drive.

The second variant of the second major form of the present invention has the transformer with longitudinal axis 4\11 of central limb 4\1 placed parallel to two electrodes [4\3 double up as the two electrodes joined electrically along imaginary joining line 4\20 to unit-turn or fractional turn secondary winding 4\2, to form the earlier mentioned channel with a uniform section, running longitudinally parallel to each longitudinal axis 4\11. The two electrodes, projecting secantwise centripetal to the circular cross section of central limb 4\1 at the aforementioned angle which is not normal to longitudinal axis 4\11 of central limb 4\1. The uniform section uniformly enclosed inside central limb 17\1. The angle is an acute angle which points as an imaginary half arrowhead to the direction of linear motion by armature means 4\4 under the influence of electromagnetic forces produced with a large induced alternating current from the electric power flowing through armature means 4\4, causing a substantial consumption of the electric power.

A plurality of the two electrodes are placed in resistive separation, side by side, forming bonded stack rod 11\25 or 12\25 along longitudinal axis 11\11 or 12\11. Bonded stack rod 11\25 is either permanently fixed to the electric transformer or is replaceable in service. Bonded stack rod 11\25 is integrated with central limb 11\1, 17\1, forming an electromagnetic flux concentrator bored cylindrical rod [FIG. 16, FIG. 17] and the electromagnetic flux concentrator bored cylindrical rod is either permanently fixed to the electric transformer or is replaceable in service.

The two electrodes reach the axis of the cylindrical rod to form the channel; the channel has a polygonal cross section component which is coaxial to the cylindrical rod; and the two electrodes are drawn in a shape with upper and lower surfaces, which perfectly fits on matching imaginary circular cone 11\40.

Armature means 4\4, 6\4 comprises central core [FIG. 9] surrounded by light-weight conductive brushes [FIG. 10] coated with already discussed dielectric means; and the brushes disposable after the armature means leave the linear motor after receiving the high velocity drive.

Secondary winding 16\2 is longitudinally enclosed externally by cylindrical or semi-cylindrical magnetic circuit 16\23 having a magnetic permeability of unity of more than unity.

The third major form of the present invention has at least one pulse transformer [FIG. 4, FIG. 6] with magnetic circuit having central limb 4\1, 6\1. Two ends 4\3, 6\3 of at least one unit-turn or fractional turn secondary winding 4\2, 6\2 of the transformer, projecting at an angle which is not normal to longitudinal axis 4\11, 6\11 of central limb 4\1, 6\1. Two ends 4\3, 6\3 substantially coplanar and symmetrically disposed on the two sides of an imaginary median, along longitudinal axis 4\11, 6\11. At least one armature means 4\4, 6\4 slidingly linking two ends 4\3, 6\3, confined to be moveable parallel to longitudinal axis 4\11, 6\11 and physically in contact with two ends 4\3, 6\3. Either armature means 4\4, 6\4 or two ends 4\3, 6\3 or both have dielectric means 4\5, 6\5 to electrically insulate armature means 4\4, 6\4 from two ends 4\3, 6\3. Dielectric means 4\5, 6\5 having unity or more than unity electrical permittivity. Two series-connected capacitors formed by the electrical permittivity of dielectric means 4\5, 6\5 between armature means 4\4, 6\4 and two ends 4\3, 6\3. The pulse transformer having primary winding 4\6, 6\6 connected with connection means 4\8, 6\8 to alternating current electric power source 4\7, 6\7. Estimation means for the resonant frequency of a series LC circuit comprising two series-connected capacitors in series to the total effective inductance of the effective inductance of alternating current power source 4\7, connection means 4\8, the pulse transformer, two ends 4\3 and armature means 4\4. Armature means 4\4 slidingly linking two ends 4\3 for a travel time which is matched to half of the time period of the resonant frequency by the variation of voltage of the electric power from the pulse current power source to the series LC circuit. The pulse current electric power source producing pulses with a rise time which is always smaller than quarter of the time period. The electrically conductive parts of primary winding 4\6 and secondary winding 4\2 of the electric transformer are either made of good conductors or superconductors; and the electrically conductive parts of armature means 4\4 too are either made of a good conductor or a superconductor.

The first variant to the third major form of the present invention has two numbers of the pulse transformer, each with longitudinal axis of each central limb 1\1, 3\1 placed parallel to each two ends 7\3, 8\3 of each secondary winding respectively integrated equipotentially in a chevron shape 7\13, 8\13 to prevent a substantial consumption of the electric power and to form a channel with a uniform section, running parallel to each aforesaid longitudinal axis; and the uniform section uniformly flanked symmetrically by the two numbers of the transformer; the most acute angle portion of chevron shape 8\13 points as an imaginary arrowhead to direction 8\11 of linear motion by armature means 3\4, 4\4 under the influence of electromagnetic forces produced with a large induced current from the electric power flowing through armature means 3\4, 4\4 causing the substantial consumption of electric power.

A plurality of unit-turn or fractional turn secondary windings 5\2, 8\2 which are placed in resistive separation, side by side, forming bonded stack rod 7\25 along the longitudinal axis; and bonded stack rod 7\25 is either permanently fixed to the electric transformer or is replaceable in service.

Armature means 3\4, 4\4 having a central core shown overall in FIG. 9 surrounded by light-weight conductive brushes shown generally in FIG. 10 coated with earlier described dielectric means; and the brushes are disposable after armature means 3\4, 4\4 leave the linear motor after the high velocity drive.

The fourth major form of the present invention has at least one pulse transformer with a magnetic circuit having central limb 4\1, 6\1. The two ends of unit-turn or fractional turn secondary winding 4\2, 6\2 of the transformer, electrically [at imaginary joining line 4\20, 6\20] joined to two electrodes projecting at an angle which is not normal to the longitudinal axis of central limb 4\1, 6\1. The two electrodes are substantially coplanar and symmetrically disposed on the two sides of an imaginary median along longitudinal axis 4\11, 6\11. At least one armature means 4\4, 6\4 slidingly linking the two electrodes, confined to be moveable parallel to the longitudinal axis and physically in contact with the two electrodes; either armature means 4\4, 6\4 or the two electrodes or both having dielectric means 4\5, 6\5 to electrically insulate armature means 4\4, 6\4 from the two electrodes; dielectric means 4\5, 6\5 having unity or more than unity electrical permittivity; two series-connected capacitors [schematically represented by capacitors 1\15 for a two-transformer version] formed by the electrical permittivity of dielectric means 4\5, 6\5 between armature means 4\4, 6\4 and the two electrodes; the pulse transformer having primary winding 4\6, 6\6 connected with connection means 4\8, 6\8 to pulse current electric power source 4\7A, 6\7A; an estimation means for the resonant frequency of a series LC circuit comprising said two series-connected capacitors in series to the total effective inductance of the effective inductance respectively of pulse current power source 4\7A or 6\7A, connection means 4\8 or 6\8, the pulse transformer, the two ends and armature means 4\4 or 6\4; armature means 4\4, 6\4 slidingly linking the two ends for a travel time which is matched to half of the time period of the resonant frequency by the variation of the voltage of the electric power from the pulse current power source to the series LC circuit; the pulse current electric power source producing pulses with a rise time which is always smaller than quarter of the mentioned time period; the electrically conductive parts of primary winding 4\6 or 6\6 and secondary winding 4\2 or 6\2 of the pulse transformer are either made of good conductors or superconductors; and the electrically conductive parts of armature means 4\4 or 6\4 too are either made of a good conductor or a superconductor.

The first variant to the fourth major form of the present invention has two numbers of the pulse transformer which have the longitudinal axis of central limb 3\1 or 5\1 placed parallel to each two electrodes which are respectively integrated equipotentially in chevron shape 3\13, 5\13 to prevent a substantial consumption of the electric power and to form a channel with a uniform section, running parallel to each aforementioned longitudinal axis [shown in FIG. 7, FIG. 8]; and the uniform section uniformly flanked symmetrically by the two numbers of pulse transformer; the most acute angle portion of chevron shape 3\13, 5\13 points as an imaginary arrowhead to the direction of linear motion by armature means 5\4, 6\4 under the influence of electromagnetic forces produced with a large induced alternating current of the electric power flowing through armature means 5\4, 6\4, causing a substantial consumption of electric power.

A plurality of the two electrodes are placed in resistive separation, side by side, forming bonded stack rod 7\25 along longitudinal axis 7\11; and bonded stack rod 7\25 is either permanently fixed to the pulse transformer or is replaceable in service.

Armature means 4\4, 6\4 comprises a central core [FIG. 9] surrounded by lightweight conductive brushes [FIG. 10] coated with aforementioned dielectric means; and the brushes disposable after armature means 4\4, 6\4 leave the linear motor after receiving the high velocity drive.

The second variant to the fourth major form of the present invention has the pulse transformer with longitudinal axis 4\11 of central limb 4\1 placed parallel to the aforesaid two electrodes [4\3 double up as the two electrodes joined electrically along imaginary joining line 4\20 to unit-turn or fractional turn secondary winding 4\2] to form the earlier mentioned channel with a uniform section, running longitudinally parallel to each longitudinal axis 4\11. The two electrodes, projecting secant-wise centripetal to the circular cross section of central limb 4\1 at the aforementioned angle which is not normal to longitudinal axis 4\11 of central limb 4\1. The uniform section uniformly enclosed inside central limb 17\1. The angle is an acute angle and points as an imaginary half arrowhead to the direction of linear motion by armature means 4\4 under the influence of electromagnetic forces produced with a large induced alternating current from the electric power flowing through armature means 4\4, causing a substantial consumption of said electric power.

A plurality of the two electrodes are placed in resistive separation, side by side, forming bonded stack rod 11\25 or 12\25 along longitudinal axis 11\11 or 12\11. Bonded stack rod 11\25 is either permanently fixed to the electric transformer or is replaceable in service. Bonded stack rod 11\25 is integrated with central limb 11\1, 17\1, forming an electromagnetic flux concentrator bored cylindrical rod [FIG. 16, FIG. 17] and the electromagnetic flux concentrator bored cylindrical rod is either permanently fixed to said pulse transformer or is replaceable in service.

The two electrodes reaching the axis of the cylindrical rod to form said channel; said channel has a polygonal cross section component which is coaxial to the cylindrical rod; and the two electrodes are drawn in a shape with upper and lower surfaces, which perfectly fits matching imaginary circular cone 11\40.

Armature means 4\4, 6\4 comprises a central core [FIG. 9] surrounded by light-weight conductive brushes [FIG. 10] coated with the dielectric means; and the brushes disposable after the armature means leave the linear motor after the high velocity drive.

Secondary winding 16\2 of the pulse transformer is longitudinally enclosed externally by cylindrical or semi-cylindrical magnetic circuit 16\23 having a magnetic permeability of unity or more than unity.

Figure 18:
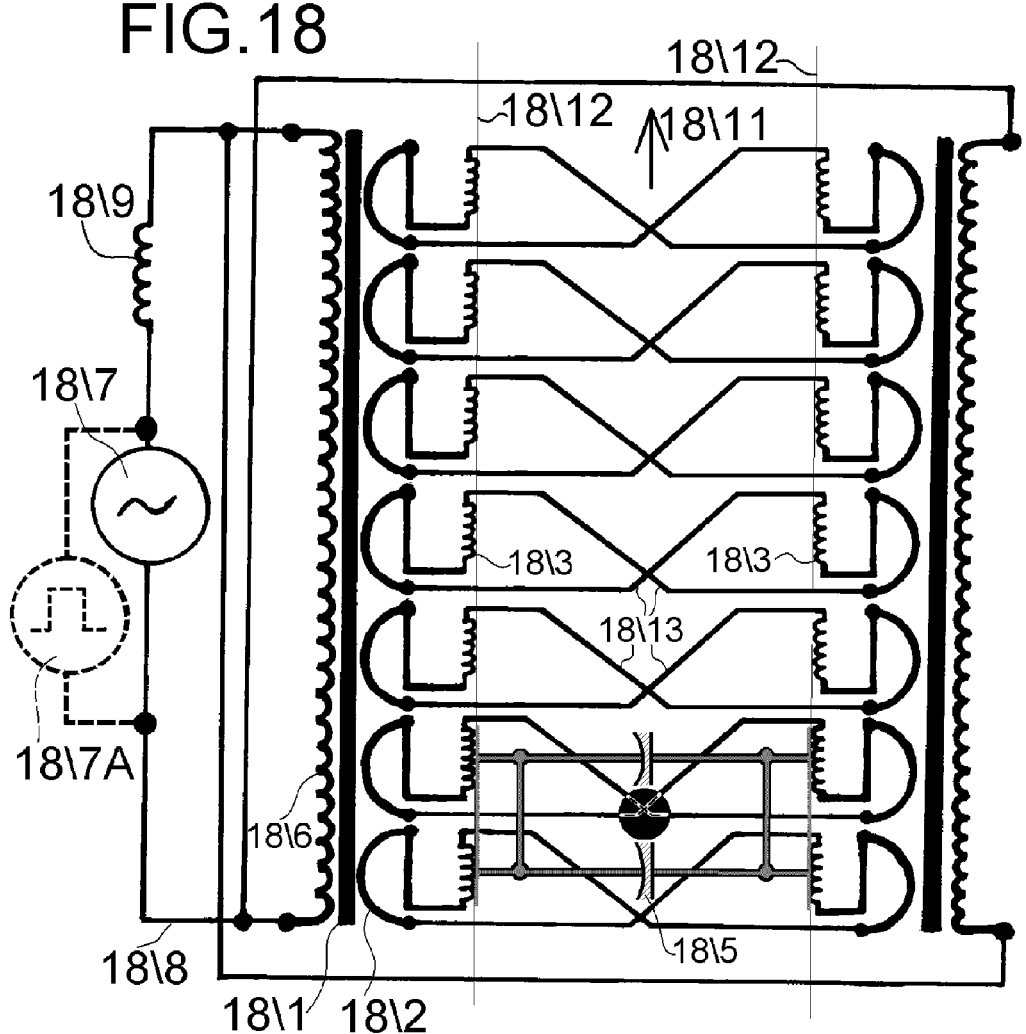
FIG. 18 is a schematic operational circuit of a two-transformer version of the present invention, where the armature means has capacitance means.
Figure 19:
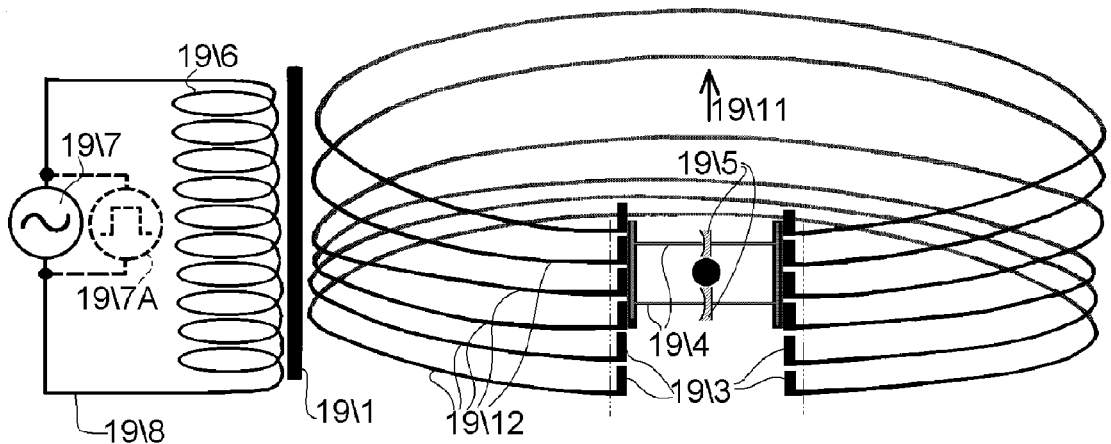
FIG. 19 is a schematic operational circuit of a single-transformer version of the present invention, where the armature means has capacitance means.

In another modified form of the present invention, a linear electric motor for high velocity drive is built with at least one electric transformer [FIG. 17, FIG. 18] with a magnetic circuit which has central limb 17\1, 18\1. This form of the present invention can be implemented along with above-mentioned variations; one who is conversant with the art can implement the variations with ease, especially with reference to the accompanying drawings. This version too relies upon series LC resonance to deliver power to the armature. However, the dielectric coating is neither on the armature's rail contact surface, nor on the rail surface; the two or more halves of the sabot form a capacitance leading to the series LC resonance. Because of the flow of ac electric power, arcing is reduced in two ways: ac currents balance the cathode flow, and the parasitic capacitance parallel to the electrical contact between the rail surface and the armature participates in the series LC resonance, increasing the effectiveness of the electrical contact.

Two ends 17\3, 18\3 of at least one unit-turn or fractional turn secondary winding 17\2, 18\2 of the transformer project at an angle which is not normal to longitudinal axis 17\11, 18\11 of central limb 17\1, 18\1. Two ends 17\3, 18\3 are substantially coplanar and symmetrically disposed on the two sides of an imaginary median along longitudinal axis 17\11, 18\11. At least one armature means 17\4, 18\4 slidingly linking two ends 17\3, 18\3, confined to be moveable parallel to longitudinal axis 17\11, 18\11 and physically in contact with two ends 17\3, 18\3. Armature means 17\4 18\4 having dielectric means 17\6, 18\6 to electrically insulate two ends 17\3, 18\3 from one another. Dielectric means 17\6, 18\6 has unity or more than unity electrical permittivity. At least two capacitors formed by the electrical permittivity of the dielectric means [FIG. 17, FIG. 18]. The electric transformer has a primary winding 17\6, 18\6 connected with connection means 17\8, 18\8 to alternating current electric power source 17\7, 18\7 or to pulse current electric power source 17\7A, 18\7A. There is an estimation means for the resonant frequency of a series LC circuit composed of the two capacitors in series to the total effective inductance of the effective inductance respectively of alternating current power source 17\7, 18\7, connection means 17\8, 18\8, the electric transformer, two ends 17\3, 18\3 and armature means 17\4, 18\4. The fundamental frequency of alternating current power source 17\7, 18\7 is matched to the resonant frequency to supply electric power from alternating current power source 17\7, 18\7 to the series LC circuit. The electrically conductive parts of primary winding 17\6, 18\6 and secondary winding 17\2, 18\2 of the electric transformer can also either be made of good conductors or superconductors; and the electrically conductive parts of armature means 17\4, 18\4 too can either be made of a good conductor or a superconductor.

A summary of the various forms of the present invention was presented to the scientists of the US Navy at the Naval Research Laboratory, South West Washington, during an official meeting on Dec. 14, 2007. In a letter dated Jan. 31, 2008, Dr. Chong K. Ong, Assiciate Director, Office of Naval Research Global, American Embassy Singapore, conveyed the US Navy's inability to fund the invention to take it further. The Assistant Secretary of the Navy in a letter dated Apr. 14, 2008 also confirmed the decision not to provide any funding to further the approach of the present invention, as it did not serve the needs of their program at the current time. It was further stated that the Navy would neither use nor release to anyone outside the Navy any of the information the inventor presented during the meeting. The travel expenses for the visit of the inventor to the USA (Arlington, Va.) to attend the meeting of Dec. 14, 2008 was funded by a Visiting Scientist Program Grant (No. VSP 4061) by DEPARTMENT OF THE NAVY, Office of Naval Research Global, 223 Old Merylbone Road, London, NW1 5$^{TH}$, UK. However, financial assistance in the form of the above-mentioned grant was related only to the inventor's visit to the USA (Arlington, Va.) for the purpose of attending the meeting of Dec. 14, 2007 and it has no bearing whatsoever on the conception and development of the present invention as disclosed hereinabove.

I claim:

1. A linear electric motor for high velocity drive, comprising:
    at least one electric transformer with a magnetic circuit having a central limb;
    the two ends of at least one unit-turn or fractional turn secondary winding of said transformer, projecting at an angle which is not normal to the longitudinal axis of said central limb;
    said two ends substantially coplanar and symmetrically disposed on the two sides of an imaginary median along said longitudinal axis;
    at least one armature means slidingly linking said two ends, confined to be moveable parallel to said longitudinal axis and physically in contact with said two ends,
    either said armature means or said two ends or both having dielectric means to electrically insulate said armature means from said two ends;
    said dielectric means having unity or more than unity electrical permittivity;
    two series-connected capacitors formed by said electrical permittivity of said dielectric means between said armature means and said two ends said electric transformer having a primary winding connected with connection means to an alternating current electric power source;
    an estimation means for the resonant frequency of a series LC circuit comprising said two series-connected capacitors in series to the total effective inductance of the effective inductance respectively of said alternating current power source, said connection means, said electric transformer, said two ends and said armature means;
    the fundamental frequency of said alternating current power source is matched to said resonant frequency to supply electric power from said alternating current power source to said series LC circuit;
    the electrically conductive parts of said primary winding and said secondary winding of said electric transformer are either made of good conductors or superconductors; and
    the electrically conductive parts of said armature means too are either made of a good conductor or a superconductor.

2. A linear motor for high velocity drive in accordance with claim 1, wherein two numbers of said transformer have each said longitudinal axis of each said central limb placed parallel to each said two ends of each said secondary winding respectively integrated equipotentially in a chevron shape to prevent a substantial consumption of said electric power and
    to form a channel with a uniform section, running parallel to each said longitudinal axis, and said uniform section uniformly flanked symmetrically by said two numbers of said transformer;
    the most acute angle portion of said chevron shape points as an imaginary arrowhead to the direction of linear motion by said armature means under the influence of electromagnetic forces produced with a large induced alternating current of said electric power flowing through said armature means, causing said substantial consumption of said electric power.

3. A linear motor for high velocity drive in accordance with claim 2, wherein a plurality of said unit-turn or fractional turn secondary windings are placed in resistive separation, side by side, forming a bonded stack along said longitudinal axis.

4. A linear motor for high velocity drive in accordance with claim 3, wherein said armature means comprises a central core surrounded by light-weight conductive brushes coated with said dielectric means; and
    said brushes disposable after said armature means leave said linear motor after said high velocity drive.

5. A linear motor for high velocity drive in accordance with claim 1, wherein said transformer has said longitudinal axis of said central limb placed parallel to said two ends of said secondary winding,
    to form said channel with a uniform section, running parallel to said longitudinal axis;
    said two ends of at least one unit-turn or fractional turn secondary winding of said transformer, projecting centripetal secant-wise to the circular cross section of said central limb at said angle which is not normal to the longitudinal axis of said central limb;
    said uniform section uniformly enclosed inside said central limb; and
    said angle is an acute angle and points as an imaginary half arrowhead to the direction of linear motion by said armature means under the influence of electromagnetic forces produced with a large induced alternating current from said electric power flowing through said armature means, causing a substantial consumption of said electric power.

6. A linear motor for high velocity drive in accordance with claim 5, wherein a plurality of said unit-turn or fractional turn secondary windings are placed in resistive separation, side by side, forming a bonded stack along said longitudinal axis;
    said bonded stack is integrated with said central limb, forming an electromagnetic flux concentrator bored cylindrical rod; and
    said electromagnetic flux concentrator bored cylindrical rod is either permanently fixed to said electric transformer or is replaceable in service.

7. A linear motor for high velocity drive in accordance with claim 6, wherein said armature means comprises a central core surrounded by light-weight conductive brushes coated with said dielectric means; and said brushes disposable after said armature means leave said linear motor after said high velocity drive.

8. A linear motor for high velocity drive in accordance with claim 6, wherein each of said plurality of unit-turn or fractional turn secondary windings is at a successive angular shift relative to the others of said plurality of unit-turn or fractional turn secondary windings;
  with said two ends, with said angular shift, reaching the axis of said cylindrical rod to form said channel;
  said channel has a circular cross section component which is coaxial to said cylindrical rod; and
  either each of said unit-turn or fractional turn secondary windings and said two ends, both, are drawn in a shape with upper and lower surfaces, which perfectly fits on a matching imaginary circular cone, or each said unit-turn or fractional turn secondary windings is circular and each said two ends are drawn in a shape with upper and lower surfaces, which perfectly fits a matching imaginary circular cone.

9. A linear motor for high velocity drive in accordance with claims 6, wherein said plurality of secondary windings are longitudinally enclosed externally by a cylindrical or semi-cylindrical magnetic circuit having a magnetic permeability of unity of more than unity.

10. A linear motor for high velocity drive, comprising:
  at least one electric transformer with a magnetic circuit having a central limb;
  the two ends of a unit-turn or fractional turn secondary winding of said transformer, respectively joined electrically to two electrodes projecting at an angle which is not normal to the longitudinal axis of said central limb;
  said two electrodes substantially coplanar and symmetrically disposed on the two sides of an imaginary median along said longitudinal axis;
  at least one armature means slidingly linking said two electrodes, confined to be moveable parallel to said longitudinal axis and physically in contact with said two electrodes;
  either said armature means or said two electrodes or both having dielectric means to electrically insulate said armature means from said two electrodes;
  said dielectric means having unity or more than unity electrical permittivity;
  two series-connected capacitors formed by said electrical permittivity of said dielectric means between said armature means and said two electrodes said electric transformer having a primary winding connected with connection means to an alternating current electric power source;
  an estimation means for the resonant frequency of a series LC circuit comprising said two series-connected capacitors in series to the total effective inductance of the effective inductance respectively of said alternating current power source, said connection means, said electric transformer, said two electrodes and said armature means;
  the fundamental frequency of said alternating current power source is matched to said resonant frequency to supply electric power from said alternating current power source to said series LC circuit;
  the electrically conductive parts of said primary winding and said secondary winding of said electric transformer are either made of good conductors or superconductors; and
  the electrically conductive parts of said armature means too are either made of a good conductor or a superconductor.

11. A linear motor for high velocity drive in accordance with claim 10, wherein
  two numbers of said transformer have each said longitudinal axis of each said central limb placed parallel to each said two electrodes respectively integrated equipotentially in a chevron shape to prevent a substantial consumption of said electric power and to form a channel with a uniform section, running parallel to each said longitudinal axis;
  and said uniform section uniformly flanked symmetrically by said two numbers of said transformer; and
  the most acute angle portion of said chevron shape points as an imaginary arrowhead to the direction of linear motion by said armature means under the influence of electromagnetic forces produced with a large induced alternating current of said electric power flowing through said armature means, causing said substantial consumption of said electric power.

12. A linear motor for high velocity drive in accordance with claim 11, wherein a plurality of said two electrodes are placed in resistive separation, side by side, forming a bonded stack rod along said longitudinal axis; and
  said bonded stack rod is either permanently fixed to said electric transformer or is replaceable in service.

13. A linear motor for high velocity drive in accordance with claim 12, wherein said armature means comprises a central core surrounded by light-weight conductive brushes coated with said dielectric means; and
  said brushes disposable after said armature means leave said linear motor after said high velocity drive.

14. A linear motor for high velocity drive in accordance with claim 10, wherein said transformer has said longitudinal axis of said central limb placed parallel to said two electrodes, to form said channel with a uniform section, running longitudinally parallel to each said longitudinal axis;
  said two electrodes, projecting secant-wise centripetal to the circular cross section of said central limb at said angle which is not normal to the longitudinal axis of said central limb;
  said uniform section uniformly enclosed inside said central limb;
  said angle is an acute angle and points as an imaginary half arrowhead to the direction of linear motion by said armature means under the influence of electromagnetic forces produced with a large induced alternating current from said electric power flowing through said armature means, causing a substantial consumption of said electric power.

15. A linear motor for high velocity drive in accordance with claim 14, wherein a plurality of said two electrodes are placed in resistive separation, side by side, forming a bonded stack rod along said longitudinal axis;
  said bonded stack rod is either permanently fixed to said electric transformer or is replaceable in service;
  said bonded stack rod is integrated with said central limb, forming an electromagnetic flux concentrator bored cylindrical rod; and
  said electromagnetic flux concentrator bored cylindrical rod is either permanently fixed to said electric transformer or is replaceable in service.

16. A linear motor for high velocity drive in accordance with claim 15, wherein said two electrodes reach the axis of said cylindrical rod to form said channel;
  said channel has a polygonall cross section component which is coaxial to said cylindrical rod; and said two electrodes are drawn in a shape with upper and lower surfaces, which perfectly fits on a matching imaginary circular cone.

17. A linear motor for high velocity drive in accordance with claim 15, wherein said armature means comprises a central core surrounded by light-weight conductive brushes coated with said dielectric means; and said brushes disposable after said armature means leave said linear motor after said high velocity drive.

18. A linear motor for high velocity drive in accordance with claim 15, wherein said secondary winding is longitudinally enclosed externally by a cylindrical or semi-cylindrical magnetic circuit having a magnetic permeability of unity of more than unity.

19. A linear electric motor for high velocity drive, comprising:

at least one pulse transformer with a magnetic circuit having a central limb;

the two ends of at least one unit-turn or fractional turn secondary winding of said transformer, projecting at an angle which is not normal to the longitudinal axis of said central limb;

said two ends substantially coplanar and symmetrically disposed on the two sides of an imaginary median along said longitudinal axis;

at least one armature means slidingly linking said two ends, confined to be moveable parallel to said longitudinal axis and physically in contact with said two ends, either said armature means or said two ends or both having dielectric means to electrically insulate said armature means from said two ends;

said dielectric means having unity or more than unity electrical permittivity;

two series-connected capacitors formed by said electrical permittivity of said dielectric means between said armature means and said two ends;

said pulse transformer having a primary winding connected with connection means to an electric pulse power source;

an estimation means for the resonant frequency of a series LC circuit comprising said two series-connected capacitors in series to the total effective inductance of the effective inductance respectively of said pulse current power source, said connection means, said pulse transformer, said two ends and said armature means;

said armature means slidingly linking said two ends for a travel time which is matched to half of the time period of said resonant frequency by the variation of voltage of the electric power from said pulse current power source to said series LC circuit;

said pulse current electric power source producing pulses with a rise time which is always smaller than quarter of said time period;

the electrically conductive parts of said primary winding and said secondary winding of said electric transformer are either made of good conductors or superconductors; and the electrically conductive parts of said armature means too are either made of a good conductor or a superconductor.

20. A linear electric motor for high velocity drive in accordance with claim 19, wherein two numbers of said transformer have each said longitudinal axis of each said central limb placed parallel to each said two ends of each said secondary winding respectively integrated equipotentially in a chevron shape to prevent a substantial consumption of said electric power and to form a channel with a uniform section, running parallel to each said longitudinal axis; and said uniform section uniformly flanked symmetrically by said two numbers of said transformer;

the most acute angle portion of said chevron shape points as an imaginary arrowhead to the direction of linear motion by said armature means under the influence of electromagnetic forces produced with a large induced current from said electric power flowing through said armature means, causing said substantial consumption of said electric power.

\* \* \* \* \*